(12) United States Patent
Kopp et al.

(10) Patent No.: US 8,715,766 B2
(45) Date of Patent: May 6, 2014

(54) PROCESS FOR PRODUCING HIGH FLAVOUR COCOA

(75) Inventors: Gabriele Margarete Kopp, Munich (DE); Milena Seyller, Munich (DE); Jozef Christiaan Hennen, Colmschate (NL); Bernhard Brandstetter, Muhldorf (DE)

(73) Assignee: Kraft Foods R&D, Inc., Deerfield, IL (US)

( * ) Notice: Subject to any disclaimer, the term of this patent is extended or adjusted under 35 U.S.C. 154(b) by 577 days.

(21) Appl. No.: 12/761,045

(22) Filed: Apr. 15, 2010

(65) Prior Publication Data
US 2010/0266741 A1  Oct. 21, 2010

(30) Foreign Application Priority Data

Apr. 17, 2009  (EP) ..................................... 09158123

(51) Int. Cl.
*A23G 1/00* (2006.01)

(52) U.S. Cl.
USPC ........................... 426/631; 426/443; 426/520

(58) Field of Classification Search
USPC ......................... 426/631, 443, 520
See application file for complete search history.

(56) References Cited

U.S. PATENT DOCUMENTS

| | | | |
|---|---|---|---|
| 571,238 A | 11/1896 | Pieper | |
| 998,113 A | 7/1911 | Neumann | |
| 1,032,931 A | 7/1912 | Neumann | |
| 1,044,758 A | 11/1912 | Dierbach | |
| 1,243,244 A | 10/1917 | Bladen | |
| 1,515,947 A | 11/1924 | Hall | |
| 1,563,682 A | 12/1925 | Barnitt | |
| 1,862,166 A | 6/1932 | Steely | |
| 2,014,342 A | 9/1935 | Gutekunst | |
| 2,212,544 A | 8/1940 | Lund | |
| 2,380,158 A | 7/1945 | Durrenmatt et al. | |
| 2,397,402 A | 3/1946 | Benedict | |
| 2,558,854 A | 7/1951 | Kempf et al. | |
| 2,745,746 A | 5/1956 | Jones | |
| 2,760,867 A | 8/1956 | Kempf | |
| 2,957,769 A | 10/1960 | Rusoff | |
| 3,707,382 A | 12/1972 | Rostagno | |
| 3,754,466 A | 8/1973 | Taralli et al. | |
| 3,769,030 A | 10/1973 | Kleinert | |
| 3,778,519 A | 12/1973 | Taralli et al. | |
| 3,809,778 A | 5/1974 | Drevici et al. | |
| 3,868,469 A | 2/1975 | Chalin | |
| 3,955,489 A | 5/1976 | Goerling et al. | |
| 4,206,245 A | 6/1980 | Drevici et al. | |
| 4,314,973 A | 2/1982 | Aspa | |
| 4,343,818 A | 8/1982 | Eggen | |
| 4,532,147 A | 7/1985 | Jonas et al. | |
| 4,704,292 A | 11/1987 | Kattenberg | |
| 4,758,444 A | 7/1988 | Terauchi et al. | |
| 4,784,866 A | 11/1988 | Wissgott | |
| 4,871,562 A | 10/1989 | Terauchi et al. | |
| 5,009,917 A | 4/1991 | Wiant et al. | |
| 5,114,730 A | 5/1992 | Ellis | |
| 5,395,635 A | 3/1995 | Yanamoto et al. | |
| 5,635,183 A | 6/1997 | Takemori et al. | |
| 5,919,502 A | 7/1999 | Manez et al. | |
| 6,015,913 A | 1/2000 | Kealey et al. | |
| 6,312,753 B1 | 11/2001 | Kealey et al. | |
| 6,399,139 B2 | 6/2002 | Myers et al. | |
| 6,485,772 B1 | 11/2002 | Tanaka et al. | |
| 6,582,747 B2 | 6/2003 | Myers et al. | |
| 2005/0276893 A1 | 12/2005 | Kealey et al. | |

FOREIGN PATENT DOCUMENTS

| | | | |
|---|---|---|---|
| DE | GB 2151454 | * | 7/1985 |
| DE | 3727148 A1 | | 9/1988 |
| EP | 0066304 A2 | | 12/1982 |
| EP | 0341431 A2 | | 11/1989 |
| EP | 0574764 A2 | | 12/1993 |
| EP | 0795276 A1 | | 9/1997 |
| EP | 0806147 A1 | | 11/1997 |
| EP | 1 106 073 A1 | | 6/2001 |
| EP | 1 649 756 A1 | | 4/2006 |
| EP | 1 862 078 A1 | | 12/2007 |
| EP | 1862078 | * | 12/2007 |
| EP | 2022335 A1 | | 2/2009 |
| GB | 999116 A | | 7/1965 |
| GB | 1357297 A | | 6/1974 |
| GB | 1399269 A | | 7/1975 |
| GB | 2007959 B | | 4/1982 |
| JP | 55135546 A | | 10/1980 |
| JP | 58-000851 A | | 1/1983 |
| JP | 58098043 A | | 6/1983 |
| JP | 3043044 A | | 2/1991 |
| JP | 04094647 A | | 3/1992 |
| JP | 6086637 A | | 3/1994 |
| JP | 6098681 A | | 4/1994 |
| JP | 6098718 A | | 4/1994 |
| JP | 2004041010 A | | 2/2004 |
| WO | 01/47367 A1 | | 7/2001 |

(Continued)

OTHER PUBLICATIONS

European Search Report, European Patent Application No. 09158123.1, date of completion of the search is Aug. 18, 2009, 8 pages.

(Continued)

*Primary Examiner* — Carolyn Paden

(74) *Attorney, Agent, or Firm* — Fitch, Even, Tabin & Flannery LLP

(57) ABSTRACT

The disclosure is directed to a process for the manufacture of roasted cocoa nibs. It is further directed to processes of producing cocoa liquor and cocoa powder from the roasted cocoa nibs.

16 Claims, 4 Drawing Sheets

(56) References Cited

FOREIGN PATENT DOCUMENTS

| WO | WO2005004619 | * | 7/2004 |
|---|---|---|---|
| WO | 2005/004619 A2 | | 1/2005 |
| WO | 2006/008627 A1 | | 1/2006 |

OTHER PUBLICATIONS

Singapore Search Report, Singapore Patent Application No. 201002760-5, date of completion of the search is Feb. 9, 2010, 19 pages.
Anon, "Cocoa Preparation by Barth's Newly Developed NARS Short Dwell Process." Confectionery Production. 1979, vol. 45, No. 12, pp. 546-548, 550, 1 page abstract available only.
Anon, "Alkalizing Roasting Sterilization of Cocoa Beans." Food Marketing & Technology, 1994, vol. 8, No. 6, pp. 35-37, 1 page abstract available only.
Anon, "Description of the Production Process Of Alkali-Treated and Sterilized Cocoa Beans And Their Derivatives (Cocoa Powder And Cocoa Butter) From Cocoa Beans." Research Disclosure, 1994, vol. 363, p. 367, 1 page abstract available only.
Bispo et al., "Alkalinization Process for Cocoa (Theobroma Cacao L.) Nibs And Quality Evaluation Of The Powder By Response Surface Methodology." Journal of Food Science and Techonology, 2002, vol. 39, No. 1, pp. 14-20, 1 page abstract available only.
Silva-Bispo et al., "Sensory Profile and Acceptance Of Alkalinized Cocoa (Theobroma Cacao L.) Powder." Cienciae-Tecnologia-de-Alimentos, 2005, vol. 25, No. 2, pp. 375-381, 1 page abstract available only.
Serra-Bonvehi et al., "Evaluation Of Purine Alkaloids And Diketopiperazines Contents In Processed Cocoa Powder." European Food Research And Technology, 2000, vol. 210, No. 3, pp. 189-195, 1 page abstract available only.
Kattenberg, "The Application Of Cocoa Powders In Chocolate Confectionery." Manufacturing Confectioner, 1995, vol. 75, No. 5, pp. 73-78 and 80-82, 1 page abstract available only.
Klienert, "From Cocoa Powder Technology To Chocolate Production Without Conching." Conference Proceedings, 1974, pp. 263-272, 1 page abstract available only.
Kostic, "Cacao Alkalization." Manufacturing Confectioner, 1997, vol. 77, No. 6, pp. 128-30, 1 page abstract available only.
Mayer-Potschak et al., "Cocoa Processing By The Nars System." Suesswarentechnik, 1980, vol. 24 No. 1/2, pp. 34-37, 1 page abstract available only.
Mayer-Potschak et al., "NARS Cocoa Treatment Challenges Liquor Roasting." Candy Industry. 1987, vol. 152, No. 9, pp. 49-50, 1 page abstract available only.
Mayer-Potschak et al., "Short Dwell Process For Alkalization, Roasting and Sterilization Of Cocoa Nibs." Candy and Snack Industry. 1980, vol. 145, No. 1, pp. 48, 50 and 58, 1 page abstract available only.
Richardson, "Cocoa and Chocolate Processing: New Developments Affect Industry Outlook." Candy and Shack Industry, 1976, vol. 141, No. 1, pp. 34-36 and 38, 1 page abstract available only.
Riedel, "Most Wanted: Red Cocoa Powder." Kakao-und-Zucker, 1986, vol. 38, No. 9, pp. 20, 23-23, 1 page abstract available only.
Rix et al., "The Bauermeister Flashell Process For the Processing Of Cocoa Beans." Confectionery Manufacture and Marketing, 1989, vol. 26, No. 10, pp. 47-49, 1 page abstract available only.
Schmid, "Cocoa Roasting Using Cocoa Nibs Or Cocoa Mass." Suesswaren., 1989, vol. 33, No. 6, pp. 251-256, 1 page abstract available only.
Urbanski, "Dark Chocolate: What Affects The Flavour?" Manufacturing Confectioner, 2001, vol. 81, No. 6, pp. 67-72, 1 page abstract available only.
Welch, "Dutched Or Alkalized Cocoa Nib Process." Manufacturing Confectioner, 1981, vol. 61, No. 3, pp. 52-53, 1 page abstract available only.
Wollgast et al., "Review On Polyphenols In Theobroma Cacao: Changes In Composition During The Manufacture Of Chocolate And Methodology For Identification And Quantification." Food Research International, 2000, vol. 33, No. 6, pp. 423-447, 1 page abstract available only.
Zubchenko et al., "Optimization Of Alkaline Processing Of Cocoa Paste." Khlebopekarnaya-i-Konditerskaya-Promyshlennost, 1982, vol. 8, pp. 35-36, 1 page abstract available only.
English Translation of Japanese Official Notice of Rejection, Japanese Patent Application 2010-092090, dated Sep. 13, 2011, 3 pages.
English Translation of Korean Notice of Preliminary Rejection, Korean Patent Application 10-2010-35067, dated Mar. 14, 2012, 6 pages.

* cited by examiner

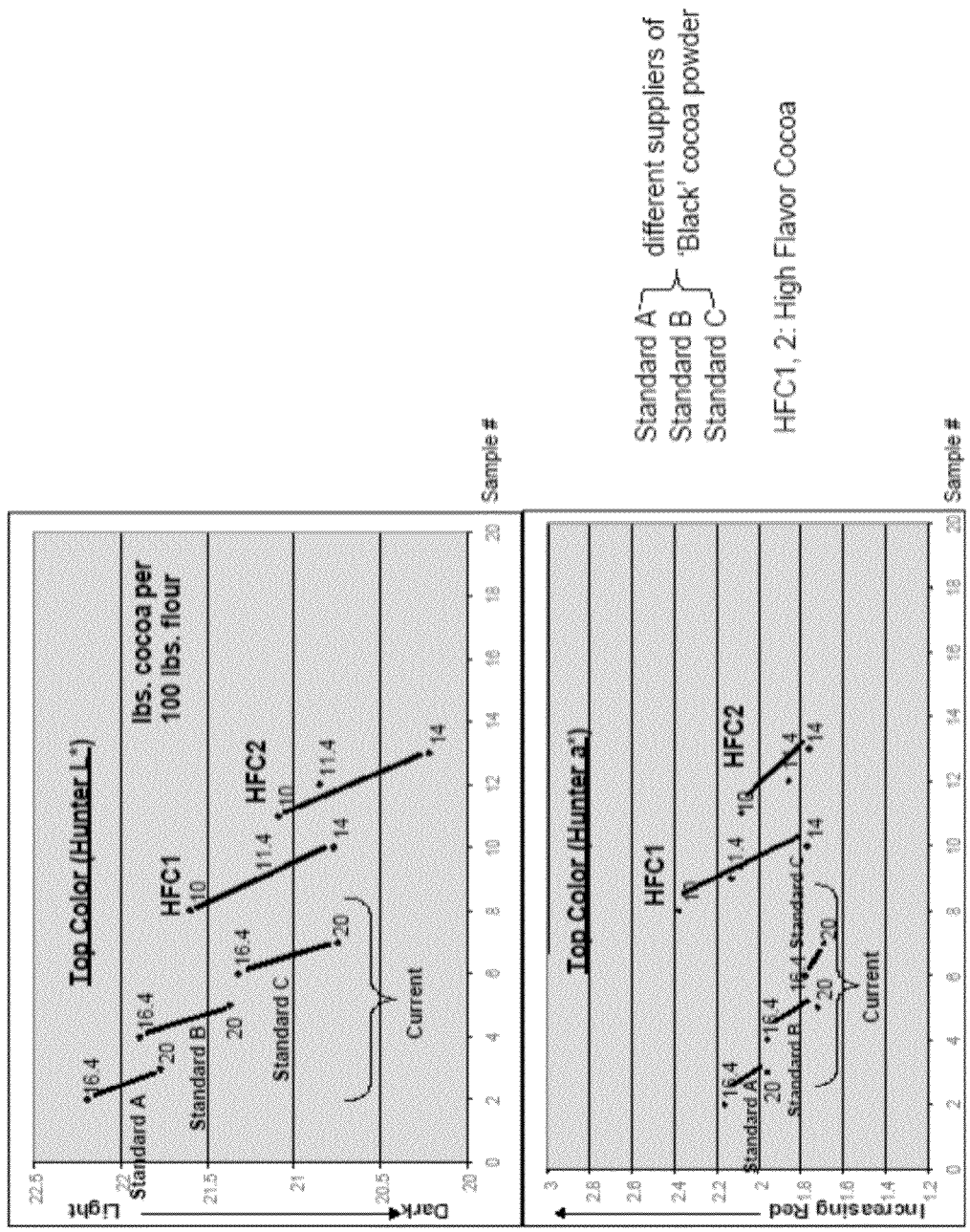

PROCESS FOR PRODUCING HIGH FLAVOUR COCOA

FIELD

The disclosure relates to a process for the manufacture of roasted cocoa nibs. It also relates to a process for the manufacture of cocoa liquor and cocoa powder.

BACKGROUND

Cocoa, including cocoa liquor and cocoa powder (cocoa solids), is the essential ingredient of chocolate and other sweet and savoury foods having a chocolate-like flavour such as biscuits, desserts and beverages. Cocoa powder is the solid, "non-fat" (conventionally 10-12 or 20-22 wt. % fat) component of cocoa liquor which is obtained by fermenting, de-shelling and roasting cocoa beans and grinding the resulting roasted nibs (the other component of cocoa liquor being cocoa butter).

In the manufacture of cocoa, steaming and alkalizing steps may be included. The steaming step may be included prior to the roasting, and prior to alkalization, for the purpose of debacterizing the cocoa beans as received after fermentation. Alternatively, the steaming or wetting step introduces water into the cocoa beans or nibs, making them more flexible to withstand the roasting without mechanical damage.

The alkalizing step in general is employed for several purposes. On the one hand, it produces a broad variety of differently coloured cocoa powders for specific applications. On the other hand, it increases the pH of the product, rendering it more soluble in an aqueous surrounding, which is important if the product is dispersed, e.g., in a beverage. Finally, the alkalizing step may improve the flavour of the final cocoa (cocoa liquor or cocoa powder).

Both the alkalizing step and the roasting step can be applied on the cocoa bean, on the cocoa nib after removal of the shell, on the cocoa liquor, on the cocoa cake after pressing off the cocoa butter, or on the cocoa powder after pulverization of the cocoa cake. Also, the sequence of the roasting and alkalizing steps may be changed, depending on equipment and functionality of the finished product.

According to U.S. Pat. No. 4,784,866, cocoa liquor and an alkalizing agent in aqueous phase are mixed and heated in a closed vessel under a pressure of from 1 to 3 atm at a temperature of less than 110° C., while introducing an oxygen-containing gas. This process is said to improve the taste and dispersibility of cocoa and to provide alkalized cocoa having a red coloration for obtaining a wider range of colour shades of red and brown.

According to WO 2006/008627, cocoa powder with better taste and brighter and more intense red colour can be obtained by a process comprising the steps of wetting cocoa nibs with water up to a water content of at least 5 wt %, grinding the wetted cocoa nibs, shaping the ground nibs to form shaped agglomerated cocoa particles, and roasting the cocoa particles at a temperature of between 80 and 160° C.

SUMMARY

The disclosure herein provides cocoa having a high flavour intensity allowing it to be used at a lower percentage in a food product, whilst maintaining the same or improved colour and flavour intensity.

It was surprisingly found that the flavour intensity of cocoa can be improved by roasting cocoa beans or cocoa nibs using a specific roasting profile. As a result, the efficacy of the cocoa can be increased, i.e. it is possible to use less cocoa in the food product, whilst maintaining or even improving the cocoa flavour and aroma of the food product, as determined in a sensory test. In addition, low quality cocoa beans can be improved in flavour.

In a first aspect, the disclosure herein provides a process for the manufacture of roasted cocoa nibs comprising the steps of
  heating cocoa beans or cocoa nibs having a moisture content of from 15 to 30 wt. % to a first holding temperature $T1$ in the range of from 85 to 95° C.,
  maintaining the cocoa beans or nibs at the first holding temperature $T1$ for a period of 10 minutes or more and at least until the moisture content of the cocoa beans or nibs is less than 15 wt. %,
  heating the cocoa beans or nibs from the first holding temperature $T1$ to a second holding temperature $T2$ in the range of from 130 to 140° C. at a rate of not more than 1° C./minute,
  maintaining the cocoa beans or nibs at the second holding temperature $T2$ for a period of from 5 to 20 minutes, wherein the cocoa beans or nibs are kept in the temperature range of 115° C. and above for a total period of at least 35 minutes,
  wherein the total period from the heating of the cocoa beans or nibs to the first holding temperature $T1$ to the end of the second holding temperature $T2$ is in the range of from 100 to 150 minutes,
  optionally de-shelling the roasted cocoa beans to obtain roasted cocoa nibs.

In a second aspect, the disclosure provides a process for the manufacture of cocoa liquor comprising cocoa solids and cocoa butter, wherein the process comprises the step of grinding the cocoa nibs roasted in accordance with the first aspect provided herein.

In a third aspect, the disclosure provides a process for the manufacture of cocoa powder comprising the step of separating the cocoa solids from the cocoa butter contained in the cocoa liquor produced in accordance with the second aspect of the invention, optionally milling the cocoa solids.

BRIEF DESCRIPTION OF THE DRAWINGS

FIG. 4 shows the colour measurement of chocolate biscuits containing different levels of standard cocoa powder or high flavour cocoa powder manufacture.

DETAILED DESCRIPTION

Figure 1:
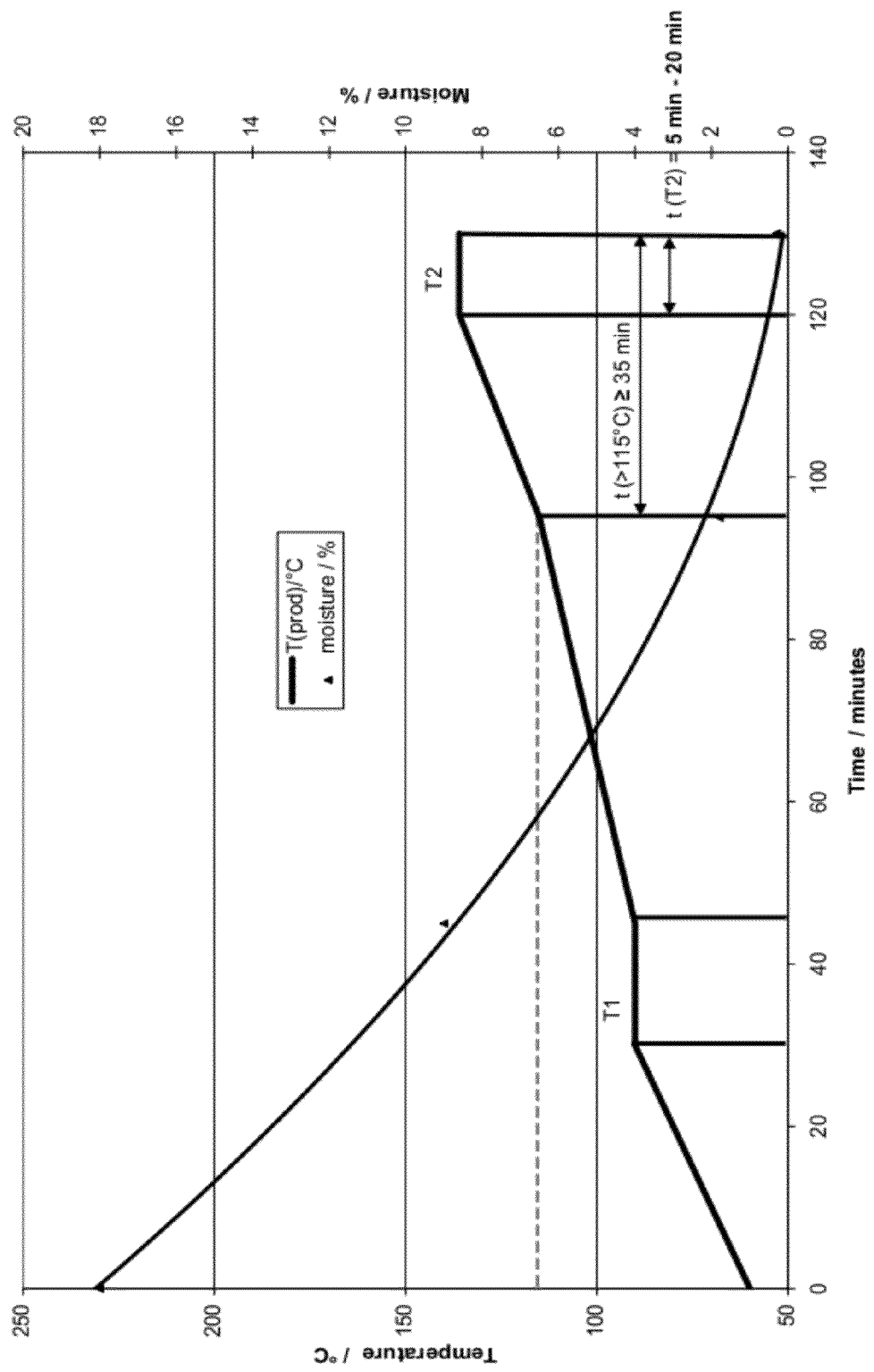
FIG. 1 shows an exemplary roasting profile in accordance with various embodiments of the invention.

In the process of the first aspect described herein, cocoa beans or cocoa nibs are roasted using a specified roasting profile. In a preferred embodiment, the process is conducted with cocoa nibs, i.e. cocoa beans which have been de-shelled and separated from the shells. If the process is carried out with cocoa beans, it is necessary to add a de-shelling step after the roasting in order to obtain roasted cocoa nibs.

In the process described herein, the cocoa beans or cocoa nibs are roasted by indirect (or contact) heating where the heat is transferred onto the beans or nibs by means of the heated walls of the roasting equipment. For example, the beans or nibs are contained in a vessel which is heated from the exterior, such as by means of a steam jacket or with (electrically) heated air or combustion gases from burning fuels. Thus, the walls of the vessel are heated and the heat is transferred onto the beans or nibs when they contact the heated walls. In one embodiment, the roasting equipment is a conventional drum roaster, such as available from G. W. Barth.

The cocoa beans or nibs used herein have a moisture content of from 15 to 30 wt. %, preferably from 15 to 22 wt. % and more preferably from 15 to 20 wt. %. The moisture content of the cocoa beans or nibs can be determined by drying and measuring the weight prior to and after drying.

The cocoa beans or nibs are firstly heated to a first holding temperature T1 in the range of from 85 to 95° C., preferably from 88 to 92° C. Most preferably, the first holding temperature T1 is about 90° C. In general, the temperatures in the roasting process are monitored and determined inline by means of a (calibrated) temperature sensor inside the roasting equipment, e.g. inside the roasting drum. The temperature can be controlled by adjusting the exterior heating.

When the first holding temperature T1 is reached, it is maintained for a period of 10 minutes or more, preferably from 10 minutes to 20 minutes, more preferably from 12 to 18 minutes. Most preferably, the period of maintaining the first holding temperature T1 is about 15 minutes. Heating is continued at least until the moisture content of the cocoa beans or nibs is reduced to less than 15 wt. %, more preferably to less than 12 wt. %.

The cocoa beans or nibs are then further heated from the first holding temperature T1 to a second holding temperature T2 in the range of from 130 to 140° C., more preferably from 133 to 138° C., even more preferably from 134 to 136° C., most preferably about 136° C. The temperature is increased from 115° C. to the second holding temperature T2 at a rate of not more than 1° C./minute, preferably at about 0.8° C./minute, such as 0.84° C./minute. The second holding temperature T2 is maintained for a period of from 5 to 20 minutes, more preferably from 5 to 15 minutes, most preferably about 10 minutes. In the heating step to T2 and the maintaining step at T2, the cocoa beans or nibs are maintained in the temperature range of 115° C. and above for a total period of at least 35 minutes.

The roasting process can usually be terminated when the moisture content of the cocoa beans or nibs is reduced to 2 wt. % or less, preferably 1.5 wt. % or less, most preferably 1 wt. % or less.

The total roasting period is in the range of from 100 to 150 minutes, preferably from 110 to 130 minutes, most preferably 120 to 130 minutes. The total roasting period is determined as that period in time ranging from the heating of the cocoa beans or nibs to the first holding temperature T1 to the end of the second holding temperature T2. The point in time "from the heating of the cocoa beans or nibs to the first holding temperature T1" is that temperature when the cocoa beans or nibs, in the roasting process, have reached a temperature of 60° C. For example, the cocoa beans or nibs may be added to the roasting vessel at room temperature, the roasting vessel is heated, and the total roasting time is counted from the time when the cocoa beans or nibs have reached a temperature of 60° C. In an alternative embodiment, the cocoa beans or nibs may be added to the roasting vessel which has been pre-heated to 60° C. In such case, the total roasting time is counted from the time when the batch of the cocoa beans or nibs has been added. When the cocoa beans or nibs have a temperature of more than 60° C., e.g., when being directly transferred from a pre-treatment or alkalizing step, the total roasting time is counted as in the case of the pre-heated roasting vessel.

After the period at the second holding temperature T2, the exterior heating is turned off and the roasted cocoa beans or nibs are removed from the roasting equipment in the usual manner, typically cooling the roasted beans or nibs by blowing with air to a temperature of 80° C. or less.

In one aspect, prior to roasting, the cocoa beans or nibs are subjected to a pre-treatment by supplying liquid water or steam and heating them, optionally under pressure, for a period of time. It has been found that this pre-treatment prepares the cocoa beans or nibs for and improves the penetration and incorporation of alkali. As a result, less alkali and a reduced alkalization time may be required to obtain the desired colour tone and intensity, without over-alkalization in the alkalizing step and without generation of off-notes due to a prolonged roasting time. In a preferred embodiment of the pre-treatment step, water—in the form of liquid water or steam—is added in an amount of from 5 to 20 wt. %, more preferably from 5 to 10 wt.%, most preferably 7 wt. %, based on the weight of the cocoa beans or nibs. The pre-treatment can preferably be carried out at a temperature of from 80 to 100° C., more preferably from 93 to 97° C., most preferably at about 95° C. In one embodiment, the pre-treatment is carried out in a stirred mixer with a jacket heating. Preferably, a cocoa nib alkalizer conventionally known in the industry, e.g. from Barth or Mitchell, can be used. The pre-treatment is usually carried out for a period of from 50 to 70 minutes, preferably for about 60 minutes. Depending on production scale, the pre-treatment time may vary. Alternatively, the pre-treatment can be carried out by adding steam at a pressure of from 2 to 4 bar, such as 2 bar, as received from conventional wet steam on-site production facilities. The steaming can be carried out for, e.g., 15 minutes, depending on the batch size to achieve full wetting of the cocoa beans or nibs. For example, at a batch size of 1,800 kg, a steaming time of 15 minutes may be necessary, whereas a steaming time of 2 minutes may suffice for a batch size of 15 kg. In the pre-treatment with steam, the equipment may be a stirred mixer with jacket heating and a means for direct steam injection, for example a cocoa nib alkalizer conventionally known in the industry, e.g. from Barth or Mitchell.

In another aspect, it was found that the colour and colour intensity as well as the flavour of the cocoa resulting from the roasting process can be improved by conducting an alkalizing step, prior to or after the roasting step, more preferably after an optional pre-treatment step and prior to the roasting process. Thus, at a reduced content of cocoa in the finished product, both flavour and colour are unchanged or even improved. Alkalizing agents conventionally used in the alkalization of cocoa beans, nibs or ground nibs can be employed, and they include one or more selected from the group consisting of ammonium, potassium or sodium bicarbonates; ammonium, potassium or sodium carbonates; and ammonium, potassium or sodium hydroxides. The alkalizing agent is preferably sodium hydroxide or potassium carbonate, each of which may be combined with ammonium carbonate.

The alkalizing agent is usually used in the form of an aqueous solution, at a concentration of from 1% (w/v) to saturation, typically from 10 to 50% (w/v), more preferably about 20% (w/v). Alkalizing agents such as ammonium carbonate can also be used in solid (dry) form. The amount of alkalizing agent will depend inter alia on its basicity, the desired alkalization level and the associated colour and colour intensity. The total amount of alkalizing agents may range from 1 to 20 wt. %, based on the weight of the cocoa beans or nibs. For example, the following amounts or combined amounts represent exemplary embodiments:

1-4% sodium hydroxide and 3-12% ammonium carbonate;
1-4% sodium hydroxide, 0.5-2% potassium carbonate and 3-12% ammonium carbonate;
1.5-3.5% potassium carbonate;

1-2% potassium carbonate and 0.5-1% sodium hydroxide; 1-2% sodium hydroxide.

When the cocoa manufactured in accordance with the disclosure provided herein is used for chocolate, legal requirements may have to be observed. For example, the EU Chocolate Directive 2000/36/EECn allows the addition of a maximum of 7 wt. % of alkalizing agent, based on dry, fat-free cocoa solids.

The alkalizing step is usually carried out in a closed vessel under heating and pressure, for example for 10 to 100 minutes at 1 to 5 bar. In a preferred embodiment, it is carried out in a stirred pressurized mixer with jacket heating and direct steam injection. In particular, a cocoa nib alkalizer as is conventionally known in the industry may be used, e.g. from Barth or Mitchell. In this embodiment, both the pre-treatment and the alkalizing step may be carried out in the same equipment.

In one embodiment, the alkalizing step includes a subsequent aeration step, in which an oxygen-containing gas such as air is injected into the vessel. For example, the aeration may be carried out with a flow rate of the oxygen-containing gas of from 0.01 to 0.1 $m^3$/(hr·kg of beans or nibs), more preferably from 0.03 to 0.08 $m^3$/(hr·kg), at an aeration time of from 30 to 60 minutes, such as about 30 minutes, at a pressure of from 0 to 2 bar, such as 2 bar, and at a temperature of from ambient temperature to 100° C., such as 85° C.

In a further embodiment, the alkalizing step may be concluded by applying vacuum to the vessel containing the alkalized and optionally aerated nibs. When the alkalizing step precedes the roasting process, the vacuum is typically 100 mbar or less, such as 40 mbar, as obtained by a conventional vacuum pump. The treatment time can be from 15 to 60 minutes. Typically, the vacuum step is carried out such that the moisture content of the cocoa beans or nibs resulting from this stage is adjusted to the moisture content required for the roasting process, i.e. in the range of from 15 to 30 wt. %, preferably from 15 to 22 wt. %, more preferably from 15 to 20 wt. %.

Following the roasting process, as detailed above, and an optional de-shelling step for removing the shells from the roasted cocoa beans, the resulting roasted nibs are milled (ground) to produce cocoa liquor comprising cocoa solids (cocoa powder) and cocoa butter, in the conventionally known manner. The cocoa liquor may be used as such in the manufacture of chocolate-flavoured products. Alternatively, using conventional processing, the cocoa powder can be separated from the cocoa butter. The cocoa powder typically is produced in two grades, containing either 10-12 wt. % or 20-22 wt. % of fat (cocoa butter), but other grades of cocoa powder, such as "fat-free" cocoa powder (<2 wt. % fat), may be produced in accordance with conventionally known processes.

By means of its specific profile with regard to temperatures, times and moisture content, the roasting process described herein allows to maximise the cocoa flavour, minimise smoky and burnt flavour notes and adjust roast flavour notes to a desired level. This results in a product which has strong cocoa and roast flavour notes, but does not taste burnt. Moreover, by applying both a pre-treatment and subsequent alkalizing step, the product can be provided with the desired dark colour, without having soapy notes owing to too strong an alkalization. The resulting cocoa powder can have an appearance in colour which is similar to that of conventional nib-alkalized or cake-alkalized cocoa powder. Yet, the flavour and intrinsic colour of the cocoa powder, i.e. its colouring efficacy, in a food product can be substantially higher and, thus, allows a considerable reduction of its content in a food product, e.g. up to 40% reduction or more.

EXAMPLES

Process parameters such as holding temperatures and moisture content are determined as follows:

Determination of Cocoa Bean or Cocoa Nib Temperature, Such as First and Second Holding Temperatures T1 and T2, Respectively The temperature of the cocoa beans or nibs is monitored inline by means of a temperature sensor inside the roasting equipment. A conventional temperature sensor having a temperature range of, e.g., 10 to 600° C., such as a PT100, may be used.

Determination of Moisture Content of Cocoa Beans or Nibs

The moisture content of the cocoa beans or nibs is determined by drying and measuring the weight prior to and after drying. For the drying, infrared drying (Mettler Toledo), microwave drying (CEM Smart) or a drying oven may be used, for example. In the measurement, 1.4 to 4 g of cocoa beans or nibs are weighed and heated to 160° C., for a maximum of 10 minutes. The moisture content is determined when the weight changes by less than 0.1 mg/minute.

Colour Properties of Cocoa Powder or Finished Product

The colour and colour intensity of the inventive cocoa powder or a respective finished product, such as a chocolate biscuit, can be characterised by means of the conventionally known Lab parameters. It is determined with a spectrocolorimeter following the Hunter colour measurement with a CIE 1964 standard observer, using a D65 illuminant and an observer angle of 8°.

In general, the lower the parameter L, the darker the powder, and the higher the parameter a/b, the brighter the powder.

Working Example

Pre-treatment: Raw cocoa nibs (moisture content: 5-7 wt. %) were pre-treated in an alkalization vessel by adding 7 wt. % water, blending the cocoa nibs and the water for 60 minutes at 95° C. The moisture content of the pre-treated cocoa nibs was 7-10 wt. %.

Alkalization: In order to produce a dark black cocoa powder ("HFC2"), the pre-treated nibs were subjected to an alkalization treatment by adding, in aqueous solution, 12 wt. % of ammonium carbonate and 2.4 wt. % of sodium hydroxide, based on the weight of the cocoa nibs, and treating the nibs with steam at a pressure of 2.5 bar for 90 minutes. Subsequently, air was injected into the alkalization vessel at 85° C. and a pressure of 2 bar for 30 minutes (0.08 $m^3$/(hr·kg)). Finally, vacuum (40 mbar) was applied for 20 minutes to adjust the moisture content of the cocoa nibs to the range of 15 to 20 wt. %.

In an alternative embodiment of the alkalization for producing a dark black cocoa powder ("HFC1") which is not as strong in alkali taste as HFC2, potassium carbonate at 2 wt.%, sodium hydroxide at 1.2 wt. % and ammonium carbonate at 12 wt. %, based on the weight of the cocoa nibs, were used. Steam was injected directly at a pressure of 2.5 bar for 90 minutes. Subsequently, the nibs were aerated at 85° C. and 2 bar for 30 minutes (0.08 $m^3$/(hr·kg)). Finally, vacuum (40 mbar) was applied for 20 minutes to adjust the moisture content of the nibs to the range of from 15 to 20 wt. %.

In yet another alternative embodiment of the alkalization for producing a bright red cocoa powder, potassium carbonate was used at 3.2%. Steam was applied directly at a temperature of 124° C. and a pressure of 1.25 bar for a period of 10 minutes. Subsequently, the nibs were aerated at 85° C. and 2 bar for 60 minutes. Finally, vacuum was applied to adjust the moisture content of the nibs to the range of from 15 to 20 wt. %.

An additive such as a mineral salt (e.g., potassium, iron, etc.) may be added in the alkalization step if desired to affect coloration.

Roasting: The nibs were loaded into a drum roaster applying the following roasting profile: The nibs were heated to the first holding temperature T1 of 90° C. and were maintained at T1 for 15 minutes, reducing the moisture content to about 9 wt. %. Subsequently, the nibs were heated to the second holding temperature T2 of 136° C., using a temperature increase in the range of from 115 to 136° C. of 0.84° C./minute, and were maintained at T2 for 10 minutes. The total roasting time was 130 minutes.

After roasting, the nibs were milled and the resulting cocoa liquor was pressed to remove cocoa butter and separate the cocoa solids (cocoa powder).

Figure 2:
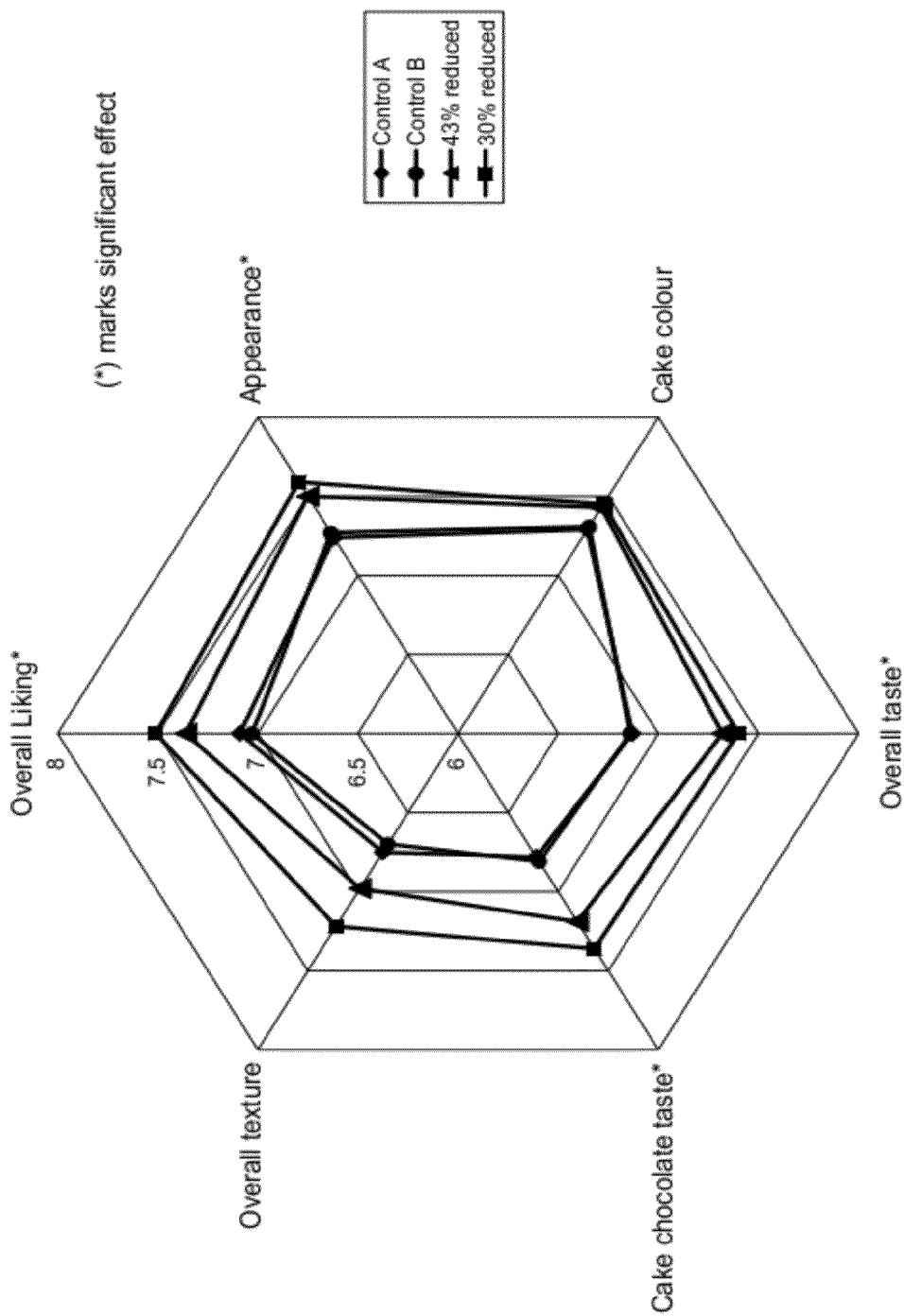
FIGS. 2 and 3 show the results of two consumer tests of chocolate biscuits produced with standard cocoa powder or high flavour cocoa powder manufactured.
Figure 3:
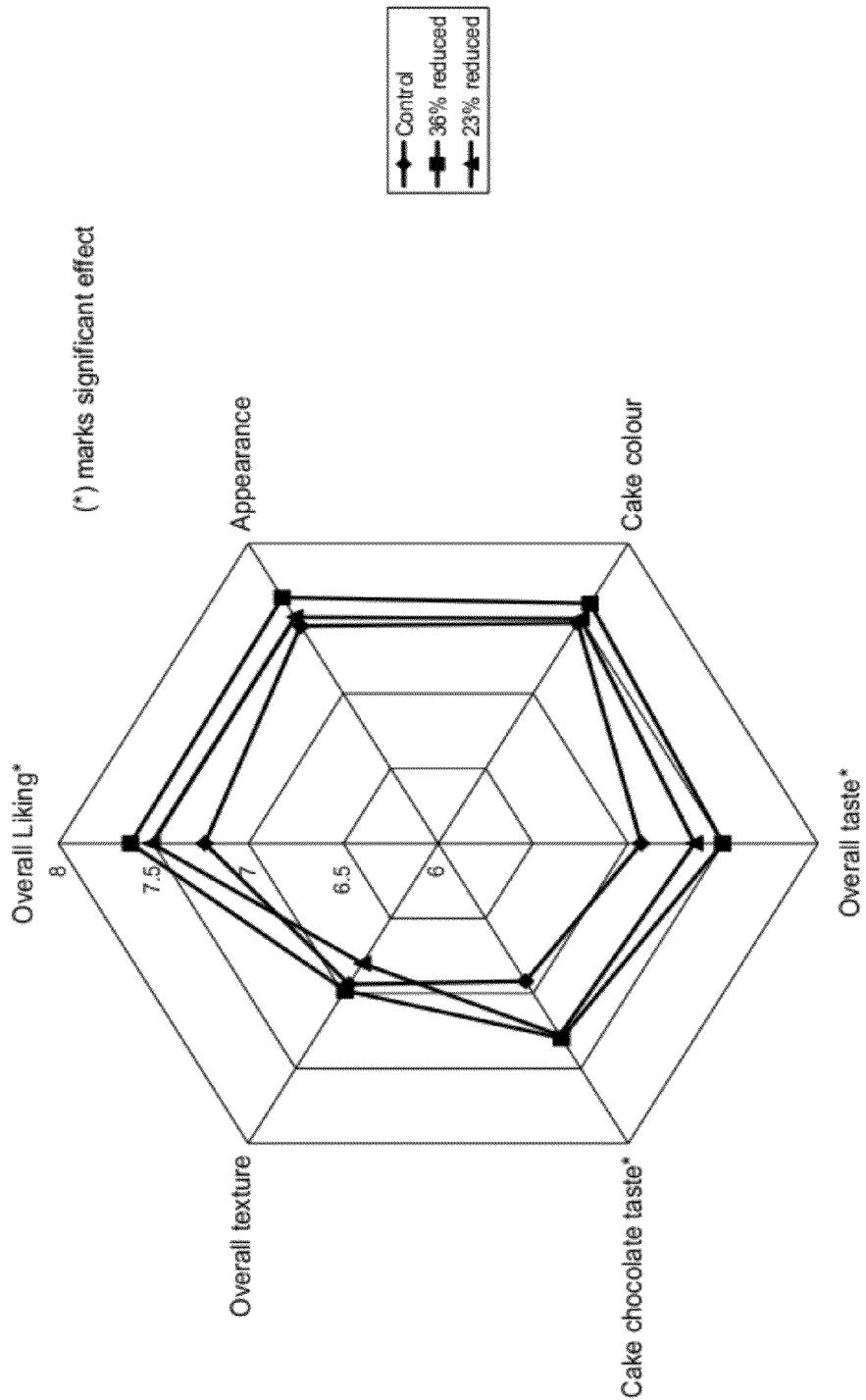

Consumer test: Cocoa powder manufactured in accordance with the method for "HFC2" was used in the manufacture of four examples of chocolate biscuits, reducing the cocoa powder between 10% and 50% as compared to a standard product using conventional cocoa powder as a reference. Two consumer tests were conducted with the following conditions:

A total of 300 consumers in each test, which met the following requirements:
100% female head of households—primary grocery shopper
Age: 18-64 years [18-34 yrs/35-49 yrs/50-64 yrs]
100% purchase and eat Oreo Cookies in the past 3 months
Must purchase and eat 4 or more bags in the past 3 months
Have not participated in a survey in the past 3 months
No food allergies or dietary concerns In the consumer tests, the overall liking of the chocolate biscuits using the inventive cocoa powder scored at parity or higher based on the reduction level as compared with the reference products. The results of the separate test items are shown in FIGS. 2 and 3.

Colour properties: The results of the colour measurement (Hunter L* and Hunter a*) of biscuits with different levels of cocoa powder (lbs. of cocoa per 100 lbs. of flour) are shown in FIG. 4.

As regards the bright red cocoa powder, it was found to allow a 20 to 40% reduction in a chocolate drink, as compared to a standard cocoa powder, at the same or improved colour and flavour properties.

The invention claimed is:

1. A process for the manufacture of roasted cocoa beans or nibs, the process comprising:
heating cocoa beans or cocoa nibs having a moisture content of from 15 to 30 wt. % to a first holding temperature in the range of from 85 to 95° C.,
maintaining the cocoa beans or nibs at the first holding temperature for a period of 10 minutes or more and at least until the moisture content of the cocoa beans or nibs is less than 15 wt. %,
heating the cocoa beans or nibs from the first holding temperature to a second holding temperature in the range of from 130 to 140° C. at a rate of not more than 1° C./minute, and
maintaining the cocoa beans or nibs at the second holding temperature for a period of from 5 to 20 minutes, wherein the cocoa beans or nibs are kept in the temperature range of 115° C. and above for a total period of at least 35 minutes to provide roasted cocoa beans or roasted cocoa nibs,
wherein the total period from the heating of the cocoa beans or nibs to the first holding temperature to the end of the second holding temperature is in the range of from 100 to 150 minutes.

2. The process of claim 1 which uses cocoa nibs.

3. The process of claim 1, wherein the heating of the cocoa beans or nibs is conducted in a drum roaster.

4. The process of claim 1, wherein the cocoa beans or nibs are subjected to a pre-treatment, prior to the heating to the first holding temperature, comprising the addition of water under heating.

5. The process of claim 4, wherein the water is added in the liquid state or in the form of steam under pressure.

6. The process of claim 1, wherein the method further comprises subjecting the cocoa beans or nibs to an alkalizing step using an alkalizing agent.

7. The process of claim 6, wherein the alkalizing agent is selected from the group consisting of ammonium, potassium or sodium bicarbonates; ammonium, potassium or sodium carbonates; ammonium, potassium or sodium hydroxides, and combinations thereof.

8. The process of claim 6, wherein the alkalizing step is followed by an aeration step, wherein the cocoa beans or nibs are contacted with an oxygen-containing gas.

9. The process of claim 8, wherein the aeration step is followed by applying a vacuum to the cocoa beans or nibs.

10. The process according to claim 6, wherein the alkalizing step is prior to heating to the first holding temperature.

11. The process according to claim 6, wherein the alkalizing step is after the heating to the second holding temperature.

12. The process according to claim 1, wherein the process further comprises de-shelling the roasted cocoa beans to obtain roasted cocoa nibs.

13. A process for the manufacture of cocoa liquor comprising cocoa solids and cocoa butter, the process comprising:
heating cocoa nibs having a moisture content of from 15 to 30 wt. % to a first holding temperature in the range of from 85 to 95° C.,
maintaining the cocoa nibs at the first holding temperature for a period of 10 minutes or more and at least until the moisture content of the cocoa nibs is less than 15 wt. %,
heating the cocoa nibs from the first holding temperature to a second holding temperature in the range of from 130 to 140° C. at a rate of not more than 1° C./minute,
maintaining the cocoa nibs at the second holding temperature for a period of from 5 to 20 minutes, wherein the cocoa nibs are kept in the temperature range of 115° C. and above for a total period of at least 35 minutes to provide roasted cocoa nibs,
wherein the total period from the heating of the cocoa nibs to the first holding temperature to the end of the second holding temperature is in the range of from 100 to 150 minutes, and
grinding the roasted cocoa nibs to provide cocoa liquor comprising cocoa solids and cocoa butter.

14. A process for the manufacture of cocoa powder, comprising the steps of manufacturing cocoa liquor in accordance with the process of claim 13, followed by separating the cocoa solids from the cocoa butter.

15. A process for the manufacture of cocoa liquor comprising cocoa solids and cocoa butter, the process comprising:
heating cocoa beans having a moisture content of from 15 to 30 wt. % to a first holding temperature in the range of from 85 to 95° C., maintaining the cocoa beans at the first holding temperature for a period of 10 minutes or more and at least until the moisture content of the cocoa beans is less than 15 wt. %, heating the cocoa beans from the first holding temperature to a second holding temperature in the range of from 130 to 140° C. at a rate of not more than 1° C./minute, maintaining the cocoa beans at the second holding temperature for a period of from 5 to 20 minutes, wherein the cocoa beans are kept in the temperature range of 115° C. and above for a total period of at least 35 minutes to provide roasted cocoa beans, wherein the total period from the heating of the cocoa beans to the first holding temperature to the end of the second holding temperature is in the range of from 100 to 150 minutes, de-shelling the roasted cocoa beans to obtain roasted cocoa nibs, and grinding the roasted cocoa nibs to provide cocoa liquor comprising cocoa solids and cocoa butter.

16. A process for the manufacture of cocoa powder, comprising the steps of manufacturing cocoa liquor in accordance with the process of claim 15, followed by separating the cocoa solids from the cocoa butter.

\* \* \* \* \*